(12) United States Patent
Kim et al.

(10) Patent No.: US 9,599,855 B2
(45) Date of Patent: Mar. 21, 2017

(54) LIQUID CRYSTAL DISPLAY

(71) Applicant: SAMSUNG DISPLAY CO., LTD., Yongin, Gyeonggi-do (KR)

(72) Inventors: Jang-Il Kim, Chungcheongnam-do (KR); Yeo Geon Yoon, Gyeonggi-do (KR); Hyoung Cheol Lee, Gyeonggi-do (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 5 days.

(21) Appl. No.: 14/305,602

(22) Filed: Jun. 16, 2014

(65) Prior Publication Data

US 2015/0185555 A1    Jul. 2, 2015

(30) Foreign Application Priority Data

Dec. 26, 2013  (KR) .................. 10-2013-0164541

(51) Int. Cl.
*G02F 1/1335* (2006.01)
*G02F 1/1333* (2006.01)

(52) U.S. Cl.
CPC .. *G02F 1/133615* (2013.01); *G02F 1/133377* (2013.01); *G02F 2001/133368* (2013.01); *G02F 2001/133548* (2013.01); *G02F 2001/133565* (2013.01)

(58) Field of Classification Search
None
See application file for complete search history.

(56) References Cited

U.S. PATENT DOCUMENTS

| | | | |
|---|---|---|---|
| 2005/0030443 A1* | 2/2005 | Nagahama | G02B 6/0088 349/64 |
| 2008/0106913 A1* | 5/2008 | Ha | 362/618 |
| 2009/0207344 A1* | 8/2009 | Ono et al. | 349/65 |
| 2011/0168999 A1* | 7/2011 | Kim | 257/59 |
| 2011/0222002 A1* | 9/2011 | Lee | 349/96 |
| 2012/0062448 A1* | 3/2012 | Kim et al. | 345/55 |
| 2012/0236589 A1 | 9/2012 | Hasegawa | |
| 2013/0093985 A1* | 4/2013 | Kang et al. | 349/106 |

FOREIGN PATENT DOCUMENTS

| | | |
|---|---|---|
| KR | 1020040036940 | 5/2004 |
| KR | 1020050123372 | 12/2005 |
| KR | 100643604 | 11/2006 |
| KR | 1020070117806 | 12/2007 |
| KR | 100798317 | 1/2008 |
| KR | 101225603 | 1/2013 |

\* cited by examiner

*Primary Examiner* — Richard Kim
(74) *Attorney, Agent, or Firm* — F. Chau & Associates, LLC

(57) ABSTRACT

A liquid crystal display according to an exemplary embodiment of the present invention includes a first substrate. A first reflection layer is disposed under the first substrate. A first polarization layer is disposed on the first substrate. A light source is disposed at a side of the first substrate. A thin film transistor is disposed on the first polarization layer. A pixel electrode is connected to the thin film transistor. The first polarization layer includes a plurality of wire grid polarization patterns.

17 Claims, 8 Drawing Sheets

LIQUID CRYSTAL DISPLAY

CROSS-REFERENCE TO RELATED APPLICATION

This application claims priority to Korean Patent Application No. 10-2013-0164541 filed in the Korean Intellectual Property Office on Dec. 26, 2013, the disclosure of which is incorporated by reference herein in its entirety.

TECHNICAL FIELD

The present invention relates to a liquid crystal display.

DISCUSSION OF THE RELATED ART

A liquid crystal display includes two substrates, a liquid crystal layer between the two substrates, and a separate backlight under the liquid crystal panel. Such structure may render the display difficult to slim down and make flexible.

SUMMARY

A liquid crystal display according to an exemplary embodiment of the present invention includes a first substrate. A first reflection layer is disposed under the first substrate. A first polarization layer is disposed on the first substrate. A light source is disposed at a lateral side of the first substrate. A thin film transistor is disposed on the first polarization layer. A pixel electrode is connected to the thin film transistor. The first polarization layer includes a plurality of wire grid polarization patterns. Light generated from the light source is incident to the first substrate through the lateral side of the substrate.

The first polarization layer may include a second reflection layer.

The second reflection layer may be disposed between the wire grid polarization patterns.

The first polarization layer may include a metal.

The lateral side of the first substrate may include a first region where the light source is disposed and a second region where no light source is disposed. The second region may include a light blocking part.

The light blocking part may include a metal paste.

A scattering pattern is disposed between the first substrate and the first reflection layer or between the first substrate and the second reflection layer.

A passivation layer is disposed on the first polarization layer and covers the wire grid polarization patterns.

The passivation layer may fill a groove between the wire grid polarization patterns.

A roof layer faces the pixel electrode. A plurality of microcavities may be disposed between the pixel electrode and the roof layer. The microcavities may form a liquid crystal layer.

A capping layer is disposed on the roof layer. A second polarization layer is disposed on the capping layer.

The liquid crystal display includes a common electrode. A lower insulating layer is disposed on the common electrode between the microcavities and the roof layer.

The microcavities may correspond to a plurality of pixel areas. A liquid crystal injection hole formation region may be disposed between the plurality of pixel areas. The capping layer covers the liquid crystal injection hole formation region.

The liquid crystal injection hole formation region may extend substantially parallel to a gate line connected to the thin film transistor.

The thin film transistor may be connected to a data line. A partition formation part may be formed between the microcavities along a direction in which the data line extends.

A second substrate faces the first substrate. A liquid crystal layer is interposed between the first substrate and the second substrate.

A second polarization layer is disposed on the second substrate.

The second polarization layer may include a polarization film.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
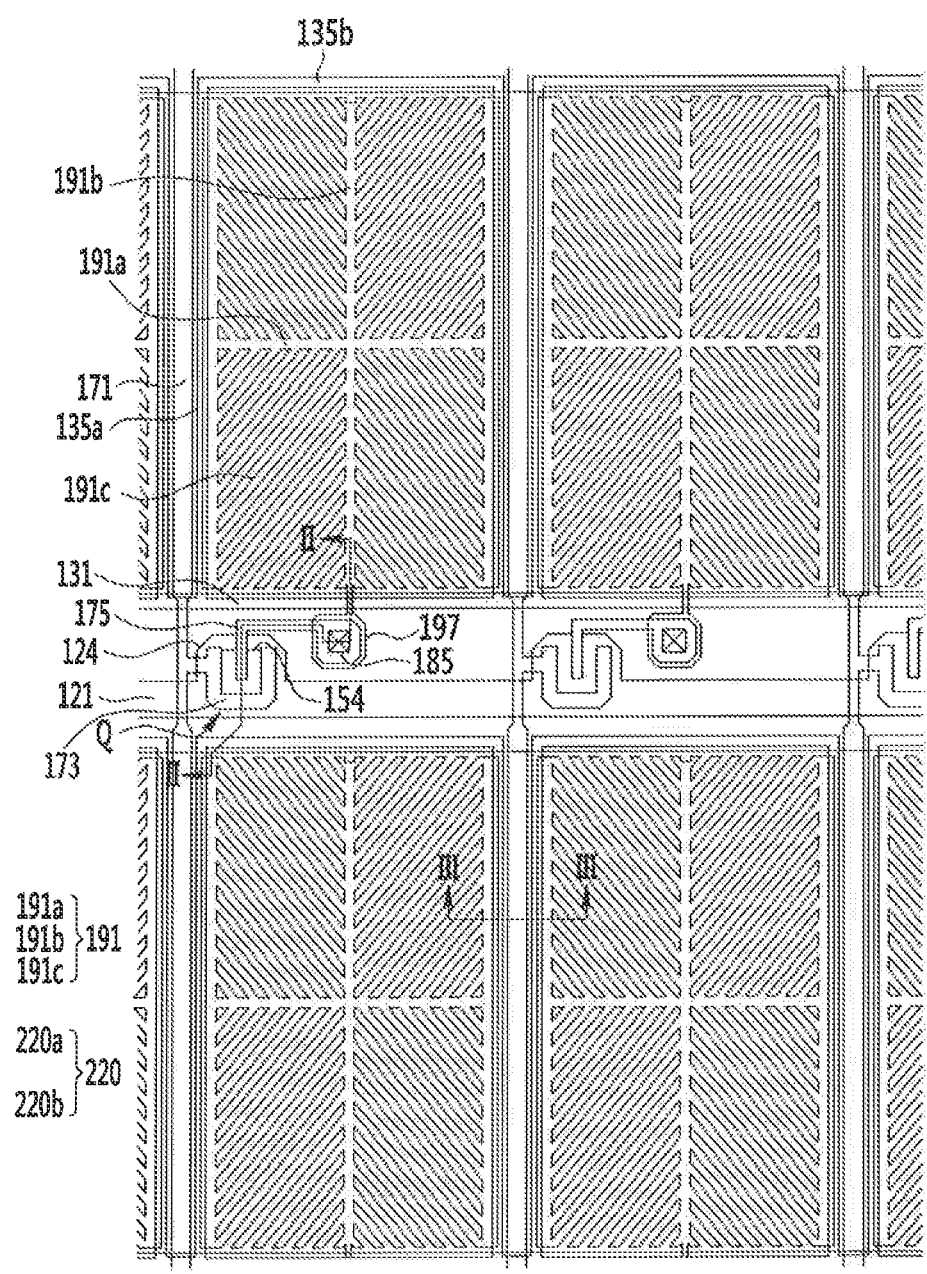
FIG. 1 is a top plan view of a liquid crystal display according to an exemplary embodiment of the present invention.

Hereinafter, exemplary embodiments of the present invention will be described in detail with reference to the accompanying drawings. It will be understood that when an element is referred to as being "on," "connected to," or "adjacent to" another element, it can be directly on, connected or adjacent to the other element, or intervening them may also be present. Like reference numerals may designate like or similar elements throughout the specification and the drawings.

Figure 2:
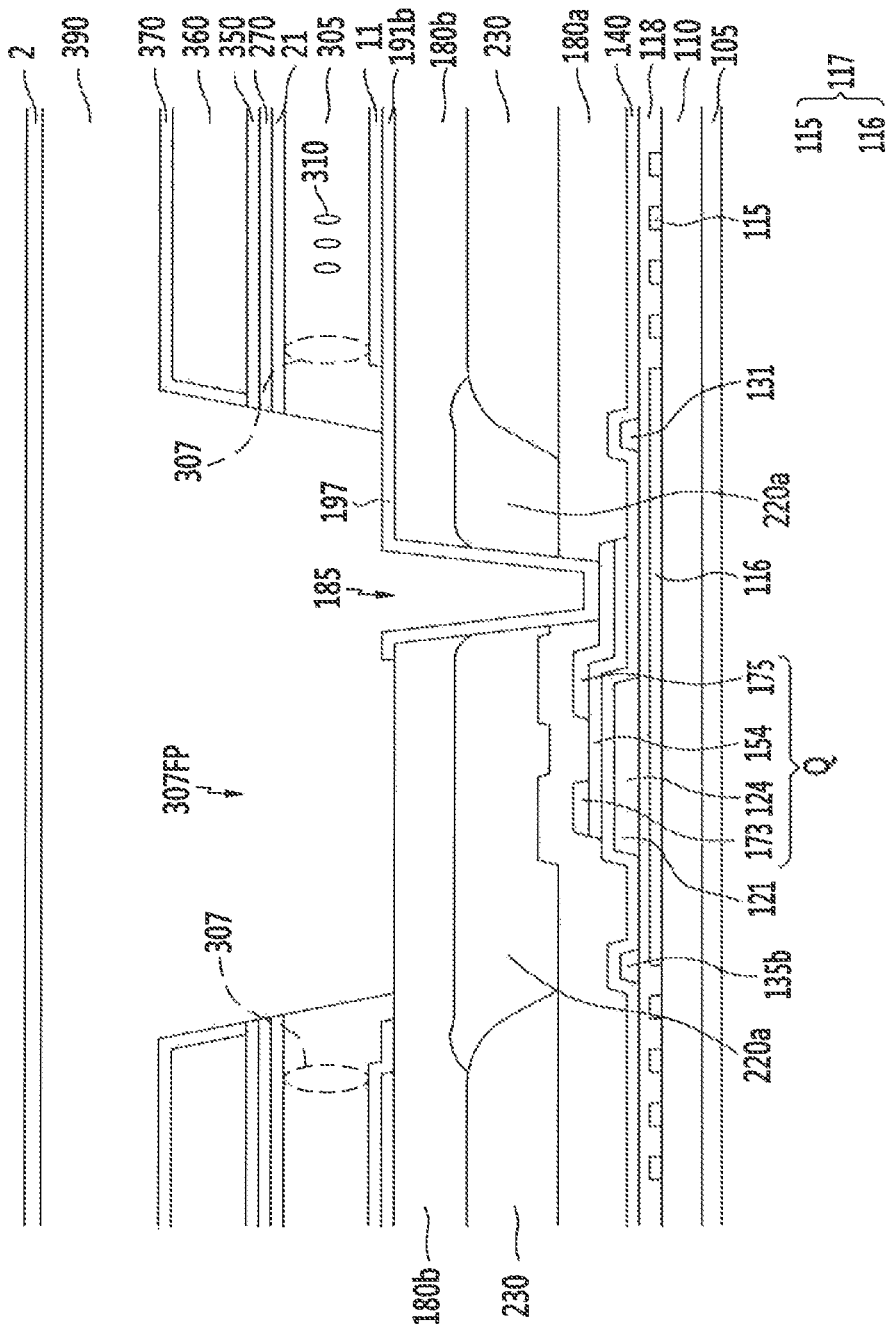
FIG. 2 is a cross-sectional view taken along the line II-II of FIG. 1, according to an exemplary embodiment of the present invention.
Figure 3:
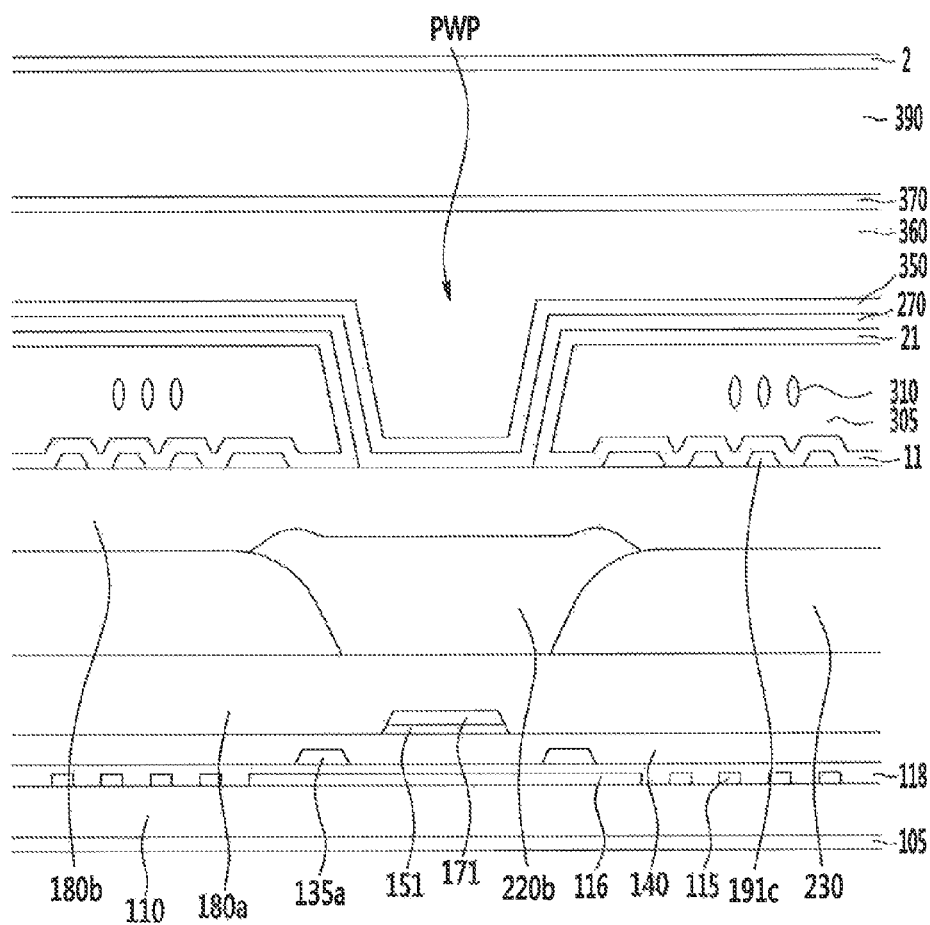
FIG. 3 is a cross-sectional view taken along the line III-III of FIG. 1, according to an exemplary embodiment of the present invention.

FIG. 1 is a top plan view of a liquid crystal display according to an exemplary embodiment of the present invention. FIG. 2 is a cross-sectional view taken along the line II-II of FIG. 1, according to an exemplary embodiment of the present invention. FIG. 3 is a cross-sectional view taken along the line III-III of FIG. 1, according to an exemplary embodiment of the present invention.

FIG. 1 represents two-by-two pixels among a plurality of pixels. The two-by-two pixels may be repeatedly arranged in a liquid crystal display according to an exemplary embodiment of the present invention.

Referring to FIG. 1 to FIG. 3, a first reflection layer 105 is disposed under a first substrate 110 made of transparent glass or plastic. The first reflection layer 105 may include a metal that may reflect light, such as aluminum.

A first polarization layer 117 is disposed on the first substrate 110. In an exemplary embodiment of the present invention, the first polarization layer 117 includes a wire grid polarization pattern 115 and a second reflection layer 116. The first polarization layer 117 includes a metal. The metal is patterned, forming the wire grid polarization pattern 115 having grooves and the second reflection layer 116 without grooves between two adjacent portions of the wire grid polarization pattern 115. Although the first polarization layer 117 is formed in a liquid crystal panel, the first polarization layer 117 includes the wire grid polarization pattern 115 including metal, and thus, the first polarization layer 117 is not damaged even when a thin film transistor is formed on the first polarization layer 117 at a high process temperature.

A passivation layer 118 is formed on the first polarization layer 117, covering the wire grid polarization pattern 115 and the second reflection layer 116. The passivation layer 118 may fill the grooves of the wire grid polarization pattern 115. The passivation layer 118 may protect the wire grid polarization pattern 115 from the external environment.

A gate line 121 and a storage electrode line 131 are disposed on the passivation layer 118. The gate line 121 includes a gate electrode 124. Storage electrode lines 131 are extended substantially in a horizontal direction of the liquid crystal display. A predetermined voltage, such as a common voltage Vcom, is transmitted through the storage electrode line 131. The storage electrode line 131 includes a pair of vertical portions 135a extending substantially perpendicular to the gate line 121 and a horizontal portion 135b connecting two opposite ends of the pair of vertical portions 135a. The storage electrode portions 135a and 135b enclose a pixel electrode 191.

A gate insulating layer 140 is formed on the gate line 121 and the storage electrode line 131. A semiconductor layer 151 and a semiconductor layer 154 are formed on the gate insulating layer 140. The semiconductor layer 151 is disposed below a data line 171, and the semiconductor layer 154 is disposed below source/drain electrodes 173 and 175 of a thin film transistor. The semiconductor layer 154 includes a channel portion of the thin film transistor.

A plurality of ohmic contacts (not shown) may be formed between the semiconductor layer 151 and the data line 171 and between the semiconductor layer 154 and the source/drain electrodes 173 and 175.

Data conductors including the source electrode 173, the data line 171 connected to the source electrode 173, and the drain electrode 175 are formed on the semiconductor layers 151 and 154 and the gate insulating layer 140.

The gate electrode 124, the source electrode 173, and the drain electrode 175, along with the semiconductor layer 154, form a thin film transistor Q, and a channel of the thin film transistor Q is formed in the semiconductor layer 154 between the source electrode 173 and the drain electrode 175.

A lower passivation layer 180a is formed on the data conductors 171, 173, and 175, and the exposed semiconductor layer 154. The lower passivation layer 180a may include an inorganic insulator such as silicon nitride (SiNx) and silicon oxide (SiOx), or an organic insulator.

A color filter 230 and a light blocking member 220 are formed on the lower passivation layer 180a.

The light blocking member 220 is formed in a lattice structure having an opening corresponding to a region displaying an image, and the light blocking member 220 is made of a material through which light is not transmitted. The color filter 230 is formed in the opening of the light blocking member 220. The light blocking member 220 includes a horizontal light blocking member 220a formed substantially parallel to the gate line 121 and a vertical light blocking member 220b formed substantially parallel to the data line 171.

An upper passivation layer 180b is formed on the color filter 230 and the light blocking member 220, covering the color filter 230 and the light blocking member 220. The upper passivation layer 180b may include an inorganic insulator, such as silicon nitride (SiNx) and silicon oxide (SiOx), or an organic insulator. As shown in FIG. 2, a step that may be created due to a thickness difference between the color filter 230 and the light blocking member 220 may be reduced or removed by the upper passivation layer 180b.

The color filter 230, the light blocking member 220, and the passivation layers 180a and 180b have a contact hole 185 exposing the drain electrode 175.

The pixel electrode 191 is formed on the upper passivation layer 180b. The pixel electrode 191 may be made of a transparent conductive material such as ITO or IZO.

The pixel electrode 191 may be substantially quadrangle in shape. The pixel electrode 191 includes a cruciform stem portion that includes a horizontal stem 191a and a vertical stem 191b intersecting the horizontal stem 191a. The pixel electrode 191 has four sub-regions formed by the horizontal stem 191a and the vertical stem 191b. Each of the sub-regions includes a plurality of fine branch portions 191c. In an exemplary embodiment of the present invention, the pixel electrode 191 further includes an outer stem enclosing the fine branch portions 191c.

The pixel electrode 191 includes an extended portion 197 connected to a lower end of the vertical stem 191b and having a wider area than the vertical stem 191b. The extended portion 197 of the pixel electrode 191 is physically and electrically connected with the drain electrode 175 through the contact hole 185. The pixel electrode 191 receives a data voltage via the drain electrode 175.

The above-described structure of the thin film transistor Q and pixel electrode 191 is merely an example, and other various structures may also apply to the thin film transistor Q and the pixel electrode 191 that may increase lateral side visibility.

A lower alignment layer 11 is formed on the pixel electrode 191. The lower alignment layer 11 may be a vertical alignment layer. The lower alignment layer 11 is a liquid crystal alignment layer. The lower alignment layer 11 may be formed of, e.g., polyamic acid, polysiloxane, or polyimide. The lower alignment layer 11 may be a photoalignment layer.

An upper alignment layer 21 is disposed facing the lower alignment layer 11. A microcavity 305 is formed between the lower alignment layer 11 and the upper alignment layer 21. A liquid crystal including liquid crystal molecules 310 is injected into the microcavity 305 through a liquid crystal injection hole 307. In an exemplary embodiment of the present invention, an alignment material for forming the alignment layers 11 and 21 and the liquid crystal 310 may be injected into the microcavity 305 by using a capillary force.

A plurality of microcavities 305 may be formed in the vertical direction of the pixel by a plurality of liquid crystal injection hole formation regions 307FP overlapping the gate line 121. A plurality of microcavities 305 may be formed in the horizontal direction of the pixel by a partition formation part PWP that is described below. For example, a plurality of microcavities 305 may be formed along a pixel column direction by the liquid crystal injection hole formation region 307FP and along a pixel row direction by the partition formation part PWP. Each of the plurality of microcavities 305 may correspond to a pixel area that may correspond to a region displaying an image.

A common electrode 270 and a lower insulating layer 350 are disposed on the upper alignment layer 21. The common electrode 270 receives a common voltage, and the pixel electrode 191 receives a data voltage, thus generating an electric field. The electric field may determine a direction in which the liquid crystal molecules 310 are inclined in the microcavity 305 between the two electrodes 270 and 191. The common electrode 270 and the pixel electrode 191 form a capacitor that may maintain a received voltage even after the thin film transistor is turned off. The lower insulating layer 350 may be formed of a silicon nitride (SiNx) or a silicon oxide (SiOx).

The common electrode 270 is formed on the microcavity 305. Alternatively, the common electrode 270 is formed under the microcavity 305, enabling coplanar electrode (CE) mode liquid crystal driving.

A roof layer 360 is disposed on the lower insulating layer 350. The roof layer 360 supports the microcavity 305 between the pixel electrode 191 and the common electrode 270. The roof layer 360 may include photoresist or other organic materials.

An upper insulating layer 370 is disposed on the roof layer 360. The upper insulating layer 370 may contact an upper surface of the roof layer 360. The upper insulating layer 370 may be formed of a silicon nitride (SiNx) or a silicon oxide (SiOx). Alternatively, the upper insulating layer 370 may be omitted.

A capping layer 390 is disposed on the upper insulating layer 370. A second polarization layer 2 is disposed on the capping layer 390. The second polarization layer 2 may be a polarization film. Alternatively, the second polarization layer 2 may include a wire grid polarization pattern similar to the first polarization layer 117.

As shown in FIG. 2, the capping layer 390 fills the liquid crystal injection hole formation region 307FP. The liquid crystal may remain in the liquid crystal injection hole formation region 307FP.

In an exemplary embodiment of the present invention, the partition formation part PWP is formed between two adjacent microcavities 305, as shown in FIG. 3. The partition formation part PWP may be formed along a direction in which the data line 171 extends, and the partition formation part PWP may be covered by the roof layer 360. The partition formation part PWP includes the lower insulating layer 350, the common electrode 270, the upper insulating layer 370, and the roof layer 360 that form a partition dividing or defining the microcavities 305. In an exemplary embodiment of the present invention, a partition structure such as the partition formation part PWP formed between the microcavities 305 may reduce stress or a change in cell gap that may occur when the first substrate 110 is bent. According to an exemplary embodiment of the present invention, a conventional type of backlight assembly is provided. The roof layer 360 is formed on the first substrate 110, and the liquid crystal is injected in the microcavities, thus eliminating the need of using an upper substrate that is positioned opposite the first substrate 110. Accordingly, the liquid crystal display may be slimmed down.

Figure 4:
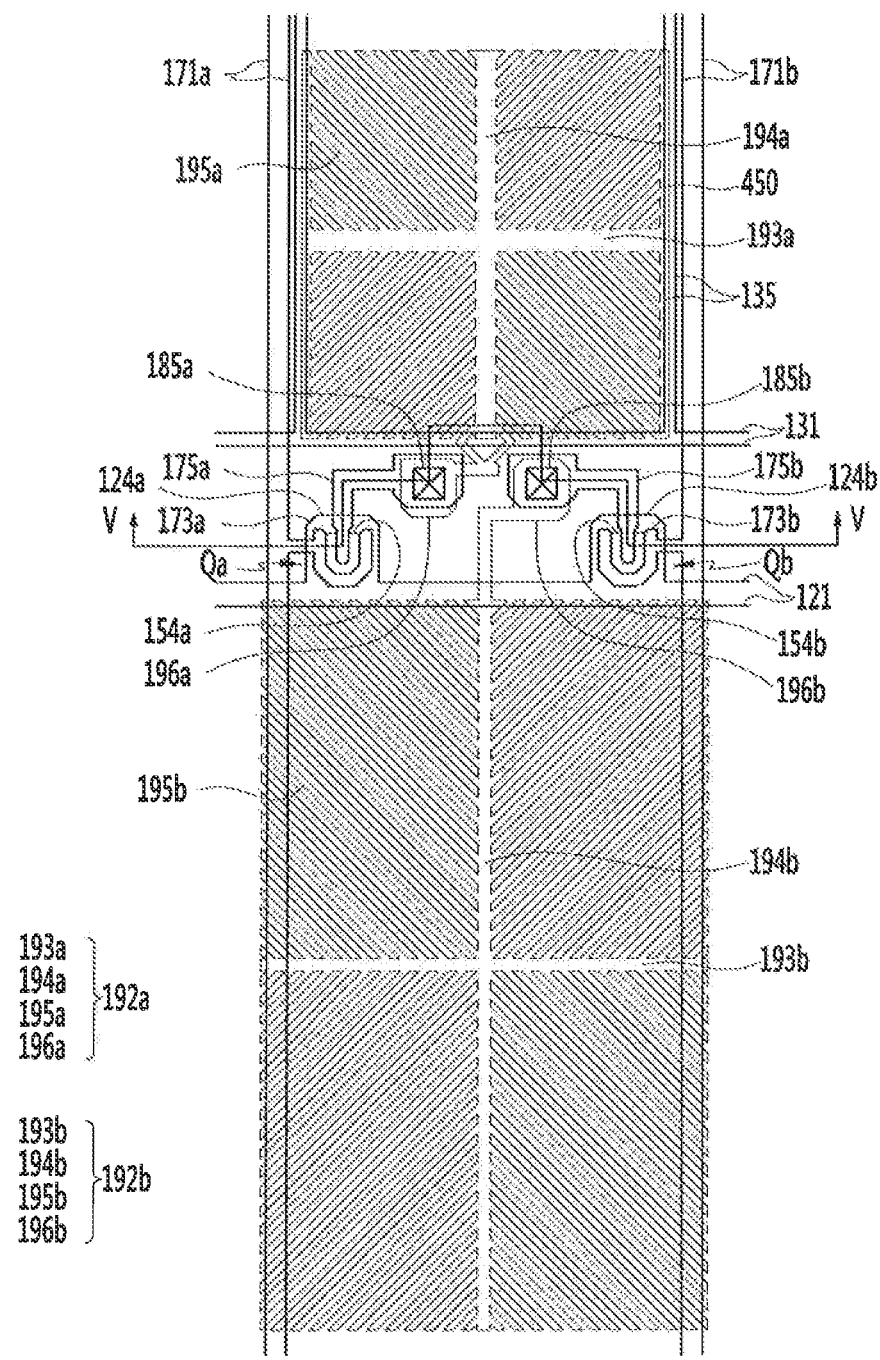
FIG. 4 is a top plan view of a liquid crystal display according to an exemplary embodiment of the present invention.
Figure 5:
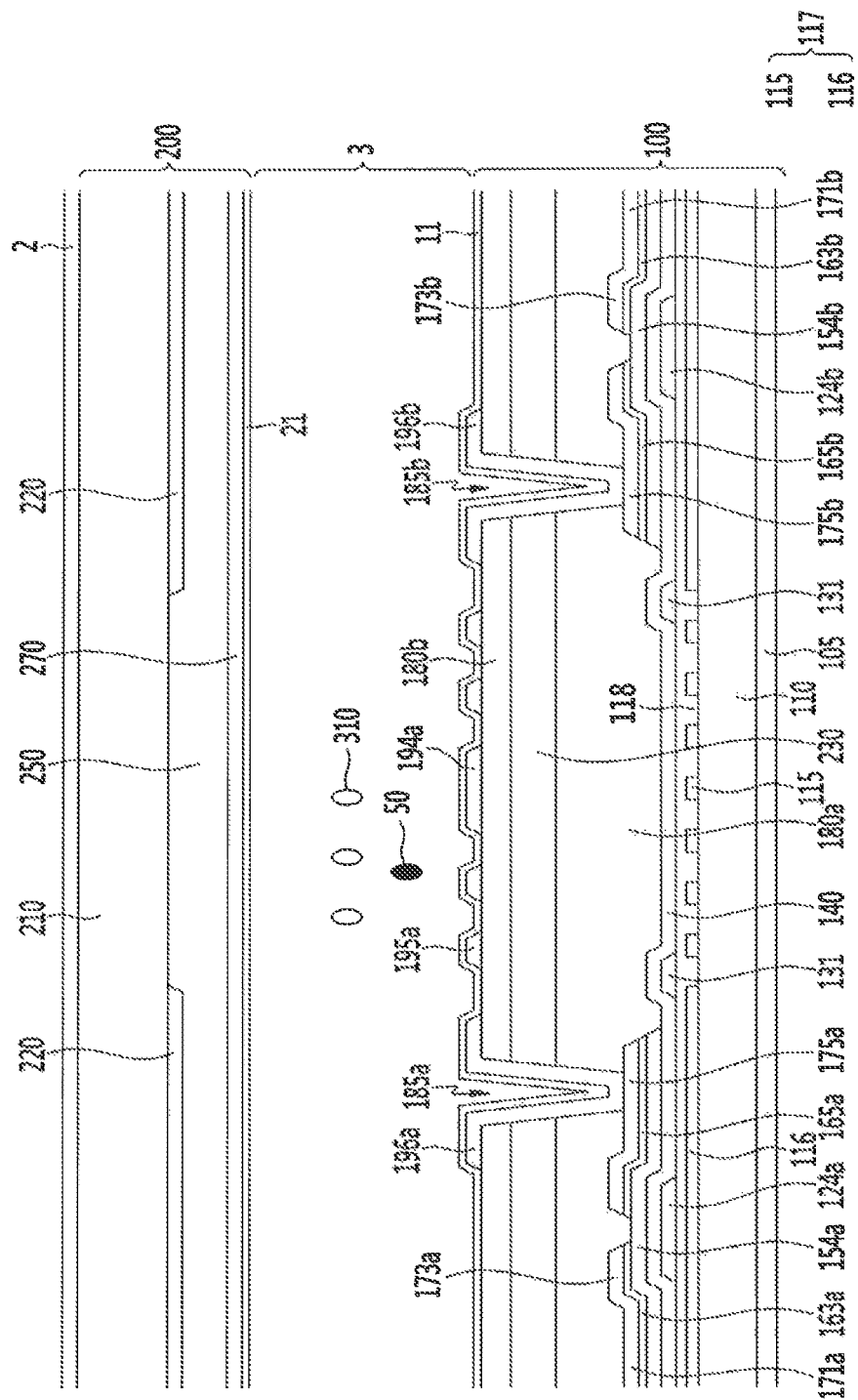
FIG. 5 is a cross-sectional view taken along the line V-V of FIG. 4, according to an exemplary embodiment of the present invention.

FIG. 4 is a top plan view of a liquid crystal display according to an exemplary embodiment of the present invention. FIG. 5 is a cross-sectional view taken along the line V-V of FIG. 4, according to an exemplary embodiment of the present invention.

Referring to FIG. 4 and FIG. 5, a liquid crystal display according to an exemplary embodiment of the present invention includes a first display panel 100 and a second display panel 200 facing each other, and a liquid crystal layer 3 interposed between the two display panels 100 and 200.

A first reflection layer 105 is disposed under a first substrate 110 made of transparent glass or plastic. The first reflection layer 105 includes a metal, such as aluminum, reflecting light.

A first polarization layer 117 is disposed on the first substrate 110. In an exemplary embodiment of the present invention, the polarization layer 117 includes a wire grid polarization pattern 115 and a second reflection layer 116. The polarization layer 117 includes a metal. The metal is patterned, forming the wire grid polarization pattern 115 having grooves and the second reflection layer 116 without grooves between two adjacent portions of the wire grid polarization pattern 115. Although the first polarization layer 117 is formed in a liquid crystal panel, the first polarization layer 117 includes the wire grid polarization pattern 115 including metal, and thus, the first polarization layer 117 is not damaged even when a thin film transistor is formed on the first polarization layer 117 at a high process temperature.

A passivation layer 118 is formed on the first polarization layer 117, covering the wire grid polarization pattern 115 and the second reflection layer 116. The passivation layer 118 may fill the grooves of the wire grid polarization pattern 115. The passivation layer 118 may protect the wire grid polarization pattern 115 from the external environment.

A gate line 121 and storage electrode lines 131 and 135 are disposed on the passivation layer 118.

The gate lines 121 transmit gate signals and are substantially extended in the horizontal direction of the pixels. Each gate line 121 includes a plurality of first and second gate electrodes 124a and 124b protruding upward.

The storage electrode lines 131 and 135 include a stem 131 extending substantially parallel to the gate lines 121, and a plurality of storage electrodes 135 extended from the stem 131. The storage electrode lines 131 and 135 may function as shielding electrodes in a structure using an organic layer under a pixel electrode 191.

Various changes may be made to the shape and arrangement of the storage electrode lines.

A gate insulating layer 140 is formed on the gate lines 121 and the storage electrode lines 131 and 135, and a plurality of semiconductor layers 154a and 154b are formed of amorphous silicon, crystalline silicon, or an oxide semiconductor on the gate insulating layer 140.

A plurality of pairs of ohmic contacts 163a and 163b, and 165a and 165b, may be formed on the semiconductor layers 154a and 154b. The ohmic contacts 163a and 163b, and 165a and 165b may be omitted when the semiconductor layers 154a and 154b are made of an oxide semiconductor. The ohmic contacts 163a and 163b, and 165a and 165b may be formed of a material such as silicide or n+ hydrogenated amorphous silicon doped with a high-concentration n-type impurity.

A plurality of pairs of data lines 171a and 171b, a plurality of pairs of first and second source electrodes 173a and 173b connected to the data lines 171a and 171b, and a plurality of pairs of first and second drain electrodes 175a and 175b facing the source electrodes 173a and 173b are formed on the ohmic contacts 163a, 163b, 165a, and 165b, and the gate insulating layer 140.

The data lines 171a and 171b transmit data signals. The data lines 171a and 171b extend substantially in the vertical direction of the pixels and cross the gate lines 121 and the stem 131 of the storage electrode lines 131 and 135. The first and second source electrodes 173a and 173b have a "U" shape toward the first and second gate electrodes 124a and 124b, and the first and second source electrodes 173a and 173b face the first and second drain electrodes 175a and 175b with respect to the first and second gate electrodes 124a and 124b.

First ends of the first and second drain electrodes 175a and 175b are enclosed by the first and second source electrodes 173a and 173b, respectively, and the first and second drain electrodes 175a and 175b extend upward. Second ends of the first and second drain electrodes 175a and 175b, each, may have a relatively wider expansion for connection to other layer.

The shape and arrangement of the data lines 171a and 171b and the first and second source electrodes 173a and 173b and the first and second drain electrodes 175a and 175b may be changed.

The first and second gate electrodes 124a and 124b, the first and second source electrodes 173a and 173b, and the first and second drain electrodes 175a and 175b, together with the first and second semiconductor layers 154a and 154b, form first and second thin film transistors (TFTs) Qa and Qb. Channels of the first and second thin film transistors Qa and Qb are formed in the first and second semiconductor layers 154a and 154b between the first and second source electrodes 173a and 173b and the first and second drain electrodes 175a and 175b.

The semiconductor layers 154a and 154b include portions between the source electrodes 173a and 173b and the drain electrodes 175a and 175b and exposed portions that are not covered by the data lines 171a and 171b and the drain electrodes 175a and 175b.

A lower passivation layer 180a is formed of a silicon nitride or a silicon oxide on the data lines 171a and 171b, the source electrodes 173a and 173b, the drain electrodes 175a and 175b, and the exposed portions of the semiconductor layers 154a and 154b. The lower passivation layer 180a may include a dual layer formed of a silicon nitride layer and a silicon oxide layer or a single silicon nitride or silicon oxide layer.

A color filter 230 may be disposed on the lower passivation layer 180a. The color filter 230 is disposed except where the first thin film transistor Qa and the second thin film transistor Qb are disposed. The color filter 230 may extend in a vertical direction between the adjacent data lines 171a and 171b. In an exemplary embodiment of the present invention, the color filter 230 is formed on the lower display panel 100. Alternatively, the color filter 230 may be formed on the second display panel 200.

An upper passivation layer 180b is formed on the color filter 230.

The upper passivation layer 180b may be formed of an organic material having photosensitivity, or an inorganic material. When the upper passivation layer 180b is formed of an organic material, the upper passivation layer 180b may planarize a layer formed under the upper passivation layer 180b. When the upper passivation layer 180b is formed of an inorganic material, the upper passivation layer 180b may increases transmittance by compensating for refractive index or may block gas from flowing out of the color filter 230.

A plurality of contact holes 185a and 185b, through which the lower passivation layer 180a and the first and second drain electrodes 175a and 175b are exposed, are formed in the upper passivation layer 180b.

A plurality of pixel electrodes 191 are formed on the upper passivation layer 180b. Each pixel electrode 191 may be formed of a transparent conductive material, such as ITO or IZO, or a reflective metal, such as aluminum, silver, chromium, or an alloy thereof.

Each pixel electrode 191 includes first and second subpixel electrodes 192a and 192b separated from each other by the gate line 121 interposed therebetween. The pixel electrode 191 is substantially quadrangle in shape. The first and second subpixel electrodes 192a and 192b respectively include horizontal stems 193a and 193b and vertical stems 194a and 194b crossing the horizontal stems 13a and 193b. Each of the first and second subpixel electrodes 192a and 192b is divided into four sub-regions by the horizontal stems 193a and 193b and the vertical stems 194b and 194b, and each sub-region includes a plurality of fine branches 195a and 195b.

A lower protrusion 196a extends from a lower end of the vertical stem 194a of the first subpixel electrode 192a and overlaps an expansion of the first drain electrode 175a. Accordingly, the vertical stem 194a and the first drain electrode 175a are connected with each other through the first contact hole 185a, and accordingly, a voltage may be transmitted through the first drain electrode 175a to the first subpixel electrode 192a.

An upper protrusion 196b of the vertical stem 194b of the second subpixel electrode 192b overlaps an expansion of the second drain electrode 175b. Accordingly, the vertical stem 194b and the second drain electrode 175b are connected with each other through the second contact hole 185b, and thus, a voltage may be transmitted through the second drain electrode 175b to the second subpixel electrode 192b.

The upper display panel 200 includes a light blocking member 220 formed on a second substrate 210 that is transparent and insulative. A second polarization layer 2 is formed opposite the second substrate 210 having the light blocking member 220. The second polarization layer 2 may have a polarization film shape. Alternatively, the second polarization layer 2 includes a wire grid polarization pattern similar to the first polarization layer 117.

The light blocking member 220 is also called a black matrix, and the light blocking member 220 blocks light leakage between two adjacent pixel electrodes 191. The light blocking member 220 may include a portion corresponding to the gate lines 121 and the data lines 171a and 171b and a portion corresponding to the thin film transistor.

The light blocking member 220 may be formed on the lower substrate 110, not on the second substrate 210. In such case, the light blocking member 220 may be disposed between two adjacent color filters 230.

An overcoat 250 is formed on the light blocking member 220. The overcoat 250 may be formed of an insulating material and provides a flat surface. Alternatively, the overcoat 250 may be omitted.

The common electrode 270 is formed on the overcoat 250. The common electrode 270 may be formed of a whole plate in a pixel region.

Alignment layers 11 and 21, respectively, are formed on internal surfaces of the lower display panel 100 and the upper display panel 200. The alignment layers 11 and 21 may be vertical alignment layers.

Polarizers (not illustrated), respectively, may be provided on external surfaces of the lower display panel 100 and the upper display panel 200.

The liquid crystal layer 3 is interposed between the lower display panel 100 and the upper display panel 200. The liquid crystal layer 3 includes a plurality of liquid crystal molecules 310 and an alignment polymer. The alignment polymer is formed by radiating light to an alignment aid 50. Alternatively, the alignment polymer is included not in the liquid crystal layer 3 but in the alignment layers 11 and 21.

The liquid crystal molecules 310 have negative dielectric anisotropy and may be oriented such that the major axes thereof are substantially perpendicular to the surfaces of the two display panels 100 and 200 when no electric field is applied.

When voltages are applied to the pixel electrode 191 and the common electrode 270, an electric field is generated between the pixel electrode 191 and the common electrode 270, and the liquid crystal molecules 310 respond to the electric field, turning their long axes into a direction substantially perpendicular to the electric field direction. The polarization of the light that is incident to the liquid crystal layer 3 varies depending on how much the liquid crystal molecules 310 are inclined. Such variation in polarization leads the polarizer to change transmittance. Accordingly, the liquid crystal display may display images.

The inclination direction of the liquid crystal molecules 310 is determined by the fine branches 194a of the pixel electrodes 191. The liquid crystal molecules 310 are inclined in the direction substantially parallel to the direction in which the fine branches 194a extend. A pixel electrode 191 includes four sub-regions Da, Db, Dc, and Dd where the fine branches 194a extend in different directions. Accordingly, the liquid crystal molecules 310 may be inclined in substantially four different directions, and the liquid crystal layer 3 is rendered to have four domains having different alignment directions of the liquid crystal molecules 310. The viewing angle of the liquid crystal display may be increased by diversify the inclined directions of the liquid crystal molecules 310.

The alignment polymer formed by the polymerization of the alignment aid 50 may control a pre-tilt as an initial alignment direction of the liquid crystal molecules 310. The alignment aid 50 may include a reactive mesogen.

Alternatively, the alignment aid 50 may be included in the alignment layers 11 and 21.

Figure 6:
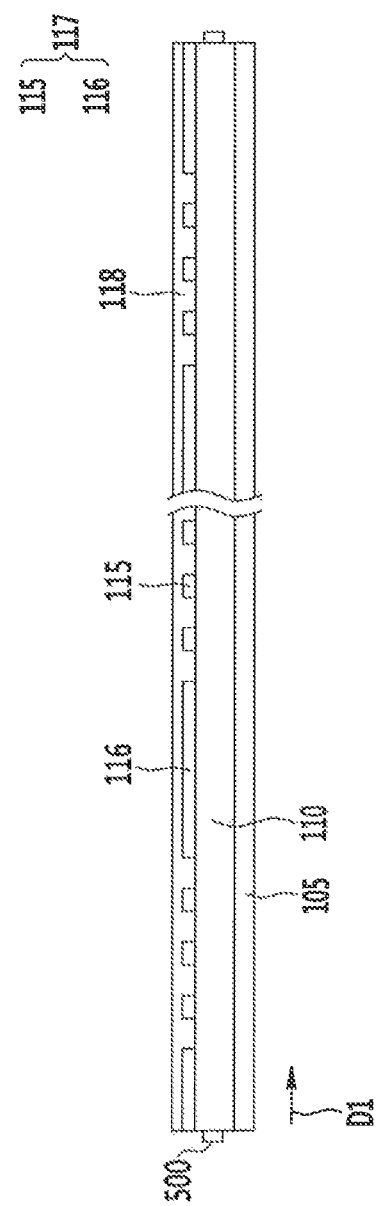
FIG. 6 is a lateral view of a substrate functioning as a backlight in a liquid crystal display according to an exemplary embodiment of the present invention.
Figure 7:
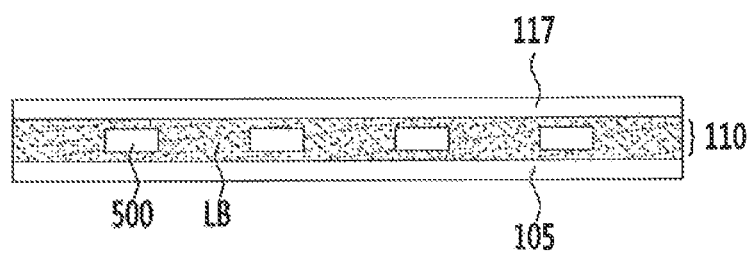
FIG. 7 is a view of a substrate shown in FIG. 6, viewed in a first direction D1, according to an exemplary embodiment of the present invention.

FIG. 6 is a lateral view of a substrate functioning as a backlight in a liquid crystal display according to an exemplary embodiment of the present invention. FIG. 7 is a view of a substrate shown in FIG. 6, viewed in a first direction D1, according to an exemplary embodiment of the present invention.

Referring to FIG. 6 and FIG. 7, a light source 500 is disposed at a lateral side of the first substrate 110. The light source 500 may include a cold cathode fluorescent lamp or a light emitting diode (LED).

Light generated from the light source 500 passes through the lateral side of the first substrate 110 to the inside of the first substrate 110. Alternatively, light sources 500, respectively, may be disposed at edges of both lateral sides of the first substrate 110, or a light source 500 may be disposed only at a lateral side.

A lateral side of the first substrate 110 where the light source 500 is disposed is referred to as a first region, and a lateral side of the first substrate 110 except for the first region is referred to as a second region. The second region may be subjected to a process for blocking light, rendering the second region to have a light blocking part LB. The light blocking part LB may be covered with a metal such as an aluminum paste. The light blocking part LB may increase transmission of light from the light source 500 through the first substrate 110 to the liquid crystal panel.

Figure 8:
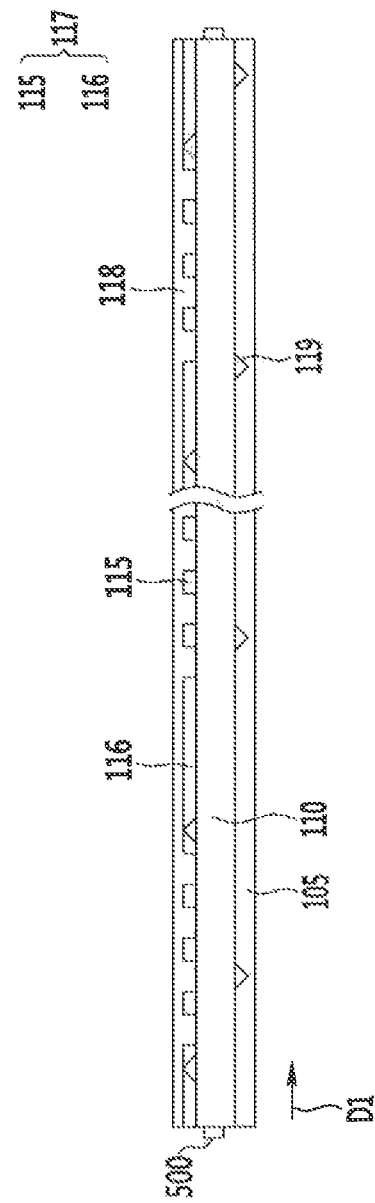
FIG. 8 is a lateral view of a substrate of a liquid crystal display according to an exemplary embodiment of the present invention.

FIG. 8 is a lateral view of a substrate of a liquid crystal display according to an exemplary embodiment of the present invention.

Referring to FIG. 8, scattering patterns 119 are disposed between the first substrate 110 and the first reflection layer 105 or between the second substrate 110 and the second reflection layer 116. Scattering patterns 119 may be disposed between the first substrate 110 and the first reflection layer 105 and between the second substrate 110 and the second reflection layer 116. The scattering patterns 119 may increase uniformity of light. The scattering patterns 119 may be spaced apart from each other at a predetermined distance.

While this invention has been shown and described in connection with exemplary embodiments thereof, it is to be understood that various changes in form and detail may be made thereto without departing from the scope of the invention defined by the following claims.

What is claimed is:

1. A liquid crystal display, comprising:
   a substrate;
   a first reflection layer disposed directly on a first surface of the first substrate;
   a polarization layer comprising a second reflection layer and a wire grid polarization pattern disposed directly on a second surface of the substrate opposite to the first surface of the substrate;
   a light source disposed on a side surface of the substrate, wherein the side surface of the substrate is substantially perpendicular to the second surface of the substrate on which the polarization layer is disposed;
   a switching element disposed on the second reflection layer;
   a pixel electrode connected to
   a switching element; and
   a liquid crystal layer disposed on the pixel electrode.

2. The liquid crystal display of claim 1, wherein the second reflection layer is disposed between the plurality of wire grid polarization patterns.

3. The liquid crystal display of claim 1, wherein the polarization layer includes a metal.

4. The liquid crystal display of claim 1, wherein the lateral side of the substrate includes a first region where the light source is disposed and a second region where no light source is disposed, and wherein the second region includes a light blocking part.

5. The liquid crystal display of claim 4, wherein the light blocking part includes a metal paste.

6. The liquid crystal display of claim 1, further comprising a scattering pattern disposed between the substrate and the first reflection layer or between the substrate and the second reflection layer.

7. The liquid crystal display of claim 1, further comprising a passivation layer disposed on the polarization layer and covering the plurality of wire grid polarization patterns.

8. The liquid crystal display of claim 7, wherein the passivation layer fills grooves formed between the plurality of wire grid polarization patterns.

9. The liquid crystal display of claim 8, further comprising a roof layer facing the pixel electrode, a plurality of microcavities disposed between the pixel electrode and the roof layer, wherein the plurality of microcavities form a liquid crystal layer.

10. The liquid crystal display of claim 9, further comprising:
a capping layer disposed on the roof layer; and
a second polarization layer disposed on the capping layer.

11. The liquid crystal display of claim 8, further comprising:
a common electrode; and
a lower insulating layer disposed on the common electrode between the plurality of microcavities and the roof layer.

12. The liquid crystal display of claim 11, wherein the plurality of microcavities correspond to a plurality of pixel areas, wherein a liquid crystal injection hole formation region is disposed between two adjacent ones of the plurality of pixel areas, and wherein the capping layer covers the liquid crystal injection hole formation region.

13. The liquid crystal display of claim 12, wherein the liquid crystal injection hole formation region extends substantially parallel to a gate line connected to the thin film transistor.

14. The liquid crystal display of claim 13, wherein the thin film transistor is connected to a data line, and wherein a partition formation part is formed between the plurality of microcavities along a direction in which the data line extends.

15. The liquid crystal display of claim 8, further comprising:
a second substrate facing the substrate; and
a liquid crystal layer interposed between the substrate and the second substrate.

16. The liquid crystal display of claim 15, further comprising a second polarization layer disposed on the second substrate.

17. The liquid crystal display of claim 16, wherein the second polarization layer includes a polarization film.

* * * * *